United States Patent
Kim et al.

(10) Patent No.: US 9,180,437 B2
(45) Date of Patent: Nov. 10, 2015

(54) METHOD OF PREPARING MAGNESIUM OXIDE STRUCTURE WITH MESO-MACRO PORES

(71) Applicant: KOREA INSTITUTE OF SCIENCE AND TECHNOLOGY, Seoul (KR)

(72) Inventors: Sang Woo Kim, Seoul (KR); In Ho Kim, Gyeonggi-do (KR); Dong Ju Moon, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 251 days.

(21) Appl. No.: 13/673,489

(22) Filed: Nov. 9, 2012

(65) Prior Publication Data

US 2013/0303357 A1  Nov. 14, 2013

(30) Foreign Application Priority Data

May 10, 2012  (KR) .................. 10-2012-0049808
Oct. 30, 2012  (KR) .................. 10-2012-0121550

(51) Int. Cl.
*B01J 23/78* (2006.01)
*B01J 37/03* (2006.01)
(Continued)

(52) U.S. Cl.
CPC .............. *B01J 23/78* (2013.01); *B01J 20/0225* (2013.01); *B01J 20/041* (2013.01); *B01J 20/28016* (2013.01); *B01J 20/28059* (2013.01); *B01J 20/28061* (2013.01); *B01J 20/28076* (2013.01); *B01J 20/28083* (2013.01); *B01J 20/3007* (2013.01); *B01J 20/3092* (2013.01); *B01J 21/10* (2013.01); *B01J 23/02* (2013.01); *B01J 23/42* (2013.01); *B01J 23/44* (2013.01);
(Continued)

(58) Field of Classification Search
CPC ............ B01J 23/78; B01J 23/42; B01J 23/02; B01J 23/745; B01J 23/50; B01J 23/755; B01J 23/464; B01J 23/75; B01J 23/52; B01J 23/72; B01J 20/0225; B01J 20/28076; B01J 20/28061; B01J 20/041; B01J 20/28016; B01J 20/28083; B01J 20/3007; B01J 20/3092; B01J 20/28059; B01J 37/08; B01J 37/031; B01J 35/1014; B01J 37/1033; B01J 37/1061; B01J 37/006; B01J 37/002
USPC ................................. 502/300–355; 423/635
See application file for complete search history.

(56) References Cited

U.S. PATENT DOCUMENTS 5,911,961 A * 6/1999 Horiuchi et al. ........... 423/213.5
6,013,599 A * 1/2000 Manson ...................... 502/340
(Continued)

FOREIGN PATENT DOCUMENTS

JP   2001-048529 A    2/2001
KR   10-1100297 B1   12/2011
WO   02/00338 A1     1/2002

OTHER PUBLICATIONS

Carreon et al., "Ordered Meso- and Macroporous Binary and Mixed Metal Oxides," Eur. J. Inorg. Chem. 2005, 27-43.*
(Continued)

*Primary Examiner* — Anthony J Zimmer
(74) *Attorney, Agent, or Firm* — Ladas & Parry LLP (57) ABSTRACT

Provided are a method of preparing a magnesium oxide structure and a magnesium oxide structure prepared by using the method. The magnesium oxide structure has meso-macro pores, a large specific surface area, and high strength, thereby enabling production of a catalyst with high catalytic activity.

17 Claims, 7 Drawing Sheets

(51) Int. Cl.
   B01J 37/08    (2006.01)
   B01J 21/10    (2006.01)
   B01J 23/02    (2006.01)
   B01J 23/42    (2006.01)
   B01J 23/44    (2006.01)
   B01J 23/46    (2006.01)
   B01J 23/50    (2006.01)
   B01J 23/52    (2006.01)
   B01J 23/72    (2006.01)
   B01J 23/745   (2006.01)
   B01J 23/75    (2006.01)
   B01J 23/755   (2006.01)
   B01J 35/00    (2006.01)
   B01J 35/10    (2006.01)
   B01J 20/28    (2006.01)
   B01J 20/04    (2006.01)
   B01J 20/30    (2006.01)
   B01J 20/02    (2006.01)

(52) U.S. Cl.
   CPC .............. *B01J 23/464* (2013.01); *B01J 23/50* (2013.01); *B01J 23/52* (2013.01); *B01J 23/72* (2013.01); *B01J 23/745* (2013.01); *B01J 23/75* (2013.01); *B01J 23/755* (2013.01); *B01J 35/002* (2013.01); *B01J 35/006* (2013.01); *B01J 35/1014* (2013.01); *B01J 35/1033* (2013.01); *B01J 35/1061* (2013.01); *B01J 37/031* (2013.01); *B01J 37/08* (2013.01)

(56) References Cited

U.S. PATENT DOCUMENTS

| | | | | |
|---|---|---|---|---|
| 6,180,559 | B1 * | 1/2001 | Roberts et al. | 502/326 |
| 6,533,994 | B2 * | 3/2003 | Masurat et al. | 266/286 |
| 2001/0000035 | A1 * | 3/2001 | Ruhl et al. | 502/103 |
| 2003/0073572 | A1 * | 4/2003 | Parrillo et al. | 502/150 |
| 2009/0281348 | A1 * | 11/2009 | Henkelmann et al. | 560/96 |
| 2010/0233051 | A1 * | 9/2010 | Grisstede et al. | 423/213.5 |

OTHER PUBLICATIONS

Yokota et al., "A new technique for preparing ceramics for catalyst support exhibiting high porosity and high heat resistance," Catalysis Today 69 (2001) 11-15.*

Carmen Quintana. et al; "Development and characterization of fluorine tin oxide electrodes modified with high area porous thin films containing aold nanoparticles", Thin Solid Films, vol. 519, pp. 487-493, Available online Aug. 6, 2010.

Korea Notice of Non-Final Rejection dated Dec. 30, 2013; Appln. No. 10-2012-0121550.

Carmen Quintana, et al; "Development and characterization of fluorine tin oxide electrodes modified with high area porous thin films containing gold nanoparticles", Thin Solid Films, vol. 519, pp. 487-493, Available online Aug. 6, 2010.

Korean Notice of Allowance, dated Nov. 12, 2014; Appln. No. 10-2012-0121550.

* cited by examiner

METHOD OF PREPARING MAGNESIUM OXIDE STRUCTURE WITH MESO-MACRO PORES

CROSS-REFERENCE TO RELATED PATENT APPLICATION

This application claims the benefit of Korean Patent Application No. 10-2012-0049808, filed on May 10, 2012 and Korean Patent Application No. 10-2012-0121550, filed on Oct. 30, 2012, in the Korean Intellectual Property Office, the disclosures of which are incorporated herein in their entirety by references.

BACKGROUND OF THE INVENTION

1. Field of the Invention

The present invention relates to a method of preparing a magnesium oxide structure for use as, for example, a catalyst support or an adsorbent of carbon dioxide. In particular, the present invention relates to a method of preparing a magnesium oxide structure with meso-macro pores.

2. Description of the Related Art

Magnesium oxides are an insulator having a wide band gap and are widely used as a catalyst, a carbon dioxide adsorbent, a refractory material, paint, a superconductor product, or the like. Typically, a magnesium oxide having a controlled nanostructure is obtained by thermal decomposition of various magnesium compounds, such as hydroxide, oxalate, carbonate, or nitrate of magnesium.

Conventionally, activities of solid materials are determined according to their initial chemical processes, and studies on magnesium oxides that are obtained through decomposition paths of various compounds such as magnesium hydroxide or magnesium carbonate report that these materials have high activity for adsorption and catalysis. However, a bottom-up process, which is kind of a method of obtaining a nanostructured magnesium oxide for heterogeneous catalysis, makes a controllable and reproducible use of nanostructures difficult, and thus, an improvement thereof is required.

Meanwhile, a catalyst support used for Fischer-Tropsch synthesis and steam reforming may be prepared to have a meso-macro multiple distributed pores structure in order to have high permeability of a reactive gas and high activity of a catalyst. In addition, a catalyst support needs to have high strength for long-term use under high-temperature and high-pressure reaction conditions, and also needs to maintain a porous nanostructure. That is, when a catalyst support is formed of an inorganic material, calcining at high temperature is required to make the catalyst support have high strength. However, the high-temperature calcining may result in collapse of a porous nanostructure that is constructed to enhance catalysis and difficulty in forming macropores.

Accordingly, there is a need to develop a method of preparing a magnesium oxide structure that enables the formation and maintenance of a nanostructure with a meso-macro pores even at high calcination temperature.

SUMMARY OF THE INVENTION

The present invention provides a method of preparing a magnesium oxide structure with meso-macro pores with high strength and large specific surface area.

The present invention also provides a magnesium oxide structure prepared by using the method.

The present invention also provides a catalyst including a magnesium oxide structure prepared by using the method.

According to an aspect of the present invention, there is provided a method of preparing a magnesium oxide catalyst support with meso-macro pores, the method including: preparing magnesium oxide precursor powder for forming mesopores; forming a powder mixture by mixing the magnesium oxide precursor powder for forming mesopores with an inorganic binder; and molding and sintering the powder mixture.

According to another aspect of the present invention, there is provided a magnesium oxide structure with meso-macro pores prepared by using the method.

According to another aspect of the present invention, there is provided a catalyst including: the magnesium oxide structure with meso-macro pores; and a catalytic component supported on the magnesium oxide structure.

According to another aspect of the present invention, there is provided a method of preparing a magnesium oxide support catalyst, the method including: supporting a catalytic component precursor on the magnesium oxide structure with meso-macro pores; and heat treating the catalytic component precursor-supported magnesium oxide structure under a hydrogen gas atmosphere.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, embodiments of the present invention are described in detail.

A method of preparing a magnesium oxide structure with meso-macro pores, according to an embodiment of the present invention, includes: preparing magnesium oxide precursor powder for forming mesopores; mixing the magnesium oxide precursor powder for forming mesopores with an inorganic binder to prepare a powder mixture; and molding and sintering the powder mixture.

Magnesium oxide precursor powder for forming mesopores used in the preparation method according to an embodiment of the present invention may be magnesium hydroxide powder, magnesium hydrogen carbonate powder, or magnesium carbonate powder. The magnesium oxide precursor powder for forming mesopores may have a spherical shape, a plate shape, or a cube shape, having a particle size of 1 to 500 µm. When the magnesium oxide precursor powder for forming mesopores is sintered, mesopores are formed inside magnesium oxide particles, and macropores are formed between magnesium oxide particles, thereby obtaining a bimodal catalyst support having meso-macro pores. By doing so, a magnesium oxide structure with meso-macro pores, a catalyst or an adsorbent including the magnesium oxide structure may be provided.

In the method of preparing the magnesium oxide structure according to an embodiment of the present invention, the preparing of the magnesium oxide precursor powder for forming mesopores may include supercritical carbon dioxide treatment of an inorganic acid salt, such as a nitrate, a sulfate, or a carbonate, of magnesium, an organic acid salt, such as an acetate, of magnesium, magnesium hydrate, or a magnesium complex. The supercritical carbon dioxide treatment may be performed at the temperature of 30 to 300° C. at a pressure of 0.5 to 30 MPa. The supercritical carbon dioxide treatment is fully disclosed in Korean Registration Patent No. 1100297, and is incorporated herein by reference.

According to another embodiment of the present invention, an inorganic acid salt, such as a nitrate, a sulfate, or a carbonate, of magnesium, an organic acid salt, such as an acetate, of magnesium, magnesium hydrate, or magnesium complex are dispersed in an organic solvent, and then, an alkali aqueous solution, such as an ammonia aqueous solution, is added thereto to form precipitate, and then, the precipitate is treated with supercritical carbon dioxide at the temperature of 30 to 300° C. under a pressure of 0.5 to 30 MPa for 1 minute to 100 hours, and the result was cooled and separated and dried, thereby completing the preparation of magnesium oxide precursor powder for forming mesopores.

When the magnesium oxide powder for forming mesopores is mixed with an inorganic binder, a precipitating agent may be additionally used.

Prior to the mixing of the magnesium oxide precursor powder for forming mesopores with an inorganic binder and a precipitating agent to form a powder mixture, the method may further include heat-treating the magnesium oxide precursor powder for forming mesopores. Due to the heat treatment, some mesopores may be formed in the magnesium oxide precursor powder for forming mesopores in advance. In this regard, cracks that may occur during sintering may be prevented. The heat treatment may be performed at the temperature of 600 to 1400° C. for 5 minutes to 48 hours. The forming of the powder mixture may include obtaining a mixed precipitate of the magnesium oxide precursor powder for forming mesopores and the inorganic binder; and solid-liquid separating the mixed precipitate. The mixed precipitate may be obtained by adding the magnesium oxide precursor powder for forming mesopores to a solution containing an inorganic binder, followed by adding a precipitating agent thereto while stirring the mixed solution, or by dispersing magnesium oxide precursor powder in a solution containing a precipitating agent, followed by adding the dispersed mixed solution to an aqueous solution including an inorganic binder.

An inorganic binder used in the method according to an embodiment of the present invention may be an inorganic gel-type metal hydroxide, and may be, for example, at least one metal hydroxide selected from magnesium hydroxide which is obtained by precipitating a metal salt, such as magnesium nitrate, magnesium sulfate, and magnesium chloride, aluminum hydroxide, and zinc hydroxide.

The inorganic binder may enable a strong bonding between magnesium oxide precursor particles when the powder mixture is molded into beads or pellets to maintain a molding strength, and even after the sintering, a formed magnesium oxide structure may retain its high strength.

The magnesium oxide precursor powder for forming mesopores and the inorganic binder may be mixed at a weight ratio of 1:9 to 99.9:0.01. When the weight ratio thereof is within this range, a magnesium oxide structure with meso-macro pores may be prepared.

The solution containing the inorganic binder may be obtained by dissolving the inorganic binder in water or an organic solvent. An example of the organic solvent may be an alcohol, such as, methanol or ethanol, and although not particularly limited, the organic solvent may be used in a molar concentration of 0.05 to 5.

In a typical method of preparing a catalyst support, an organic binder is used for binding of catalyst support precursor powder and maintaining of a porous nanostructure of a support. However, since the organic binder is combusted during high-temperature sintering, the porous nanostructure of a catalyst support collapses and at last, a catalyst support with high strength was not able to be obtained.

However, according to embodiments of the present invention, an inorganic binder, which is highly resistant to heat, is used. Accordingly, even after high-temperature sintering, the porous nanostructure of a catalyst support is maintained, and thus, the nanostructure is maintained constant even after a catalyst is supported, thereby obtaining a supported catalyst with excellent catalytic activity. That is, the inorganic binder acts as a matrix for a catalyst support to maintain binding between support particles, and also acts as a component that consists of the porous nanostructure. For example, when magnesium hydroxide is used as the inorganic binder, a magnesium oxide, which is a final form of the magnesium hydroxide, is formed, and when magnesium hydroxide and aluminum hydroxide are used together as the inorganic binder, spinel or magnesium oxide and aluminum oxide are formed according to a composition or a temperature.

In addition, according to embodiments of the present invention, an organic binder, which is used in a typical method, may be further used.

The precipitating agent used in the method according to an embodiment of the present invention may be ammonia water.

The powder mixture is molded and sintered to form a magnesium oxide structure with meso-macro pores. In this regard, the molding method is not particularly limited, and may be, for example, combining a binder, water, or an organic solvent and the powder mixture to form a slurry paste or a clay-like mixture and then applying the paste or clay-like mixture into a mold. The binder may be at least one selected from the inorganic binder and the organic binder described above. For use as the inorganic binder, the inorganic binders described above may be used, and for use as the organic binder, materials used in the art may be used unlimitedly. The organic binder may include at least one selected from cellulose binder, polyvinyl alcohol, polyvinylpyrrolidone, polyethylene glycol, gel-binder, and starch. The molding may be performed by extrusion molding, pressing molding, or applying onto a processed sheet. A plunger type extruder, a screw-type extruder, or the like may be used to easily form a bead shape, a pellet shape, a honeycomb-shape.

If necessary, a molded product may be added to an antisolvent or substitution solvent, that is, an organic solvent of dimethyl ether, an aromatic hydrocarbon, such as toluene, or an alcohol organic solvent to improve a molding property and a drying speed.

After the molding, if necessary, drying is performed, and then, sintering is performed at the temperature of 800 to 1,300° C. to form a magnesium oxide structure with meso-macro pores. In this regard, nitrogen gas may be used as a carrier gas. For example, under a nitrogen gas atmosphere, a temperature increased from room temperature to 800 to 1,300° C. at a temperature increase rate of 1 to 10° C. per minute, and then, the increased temperature is maintained for 30 minutes to 5 hours and then the temperature decreased to room temperature at a temperature decrease rate of 1 to 10° C. per minute.

In the method of preparing a magnesium oxide structure with meso-macro pores according to an embodiment of the present invention, a porous structure and strength of a molded structure may be appropriately changed by controlling the kind and concentration of magnesium oxide precursor, the kind and shape of metal compound powder formed by supercritical reaction, a composition of metal compound powder and precipitate, a sintering temperature, or the like, according to purpose.

Figure 1:
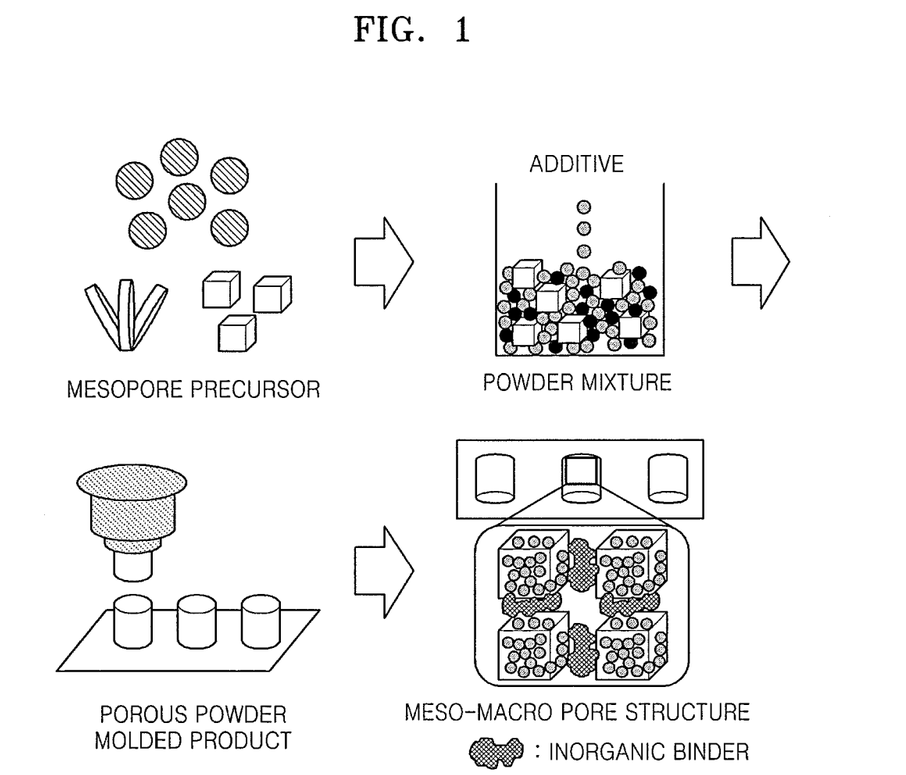
FIG. 1 is a schematic diagram illustrating a method of preparing a magnesium oxide structure according to an embodiment of the present invention.

FIG. 1 is a schematic diagram illustrating a method of preparing a magnesium oxide structure according to an embodiment of the present invention.

Referring to FIG. 1, an inorganic binder and a precipitating agent are added to spherical sphere-, plate-, or cube-like magnesium oxide precursor powder for forming mesopores to obtain a powder mixture in which the magnesium oxide precursor powder for forming mesopores is dispersed in the inorganic binder, and the resultant is molded and sintered to obtain a magnesium oxide structure with meso-macro pores that have mesopores inside particles and macropores between particles.

Another aspect of the present invention provides a magnesium oxide structure with meso-macro pores prepared by using the method described above. The magnesium oxide structure may be a catalyst support or an adsorbent.

In the magnesium oxide catalyst structure according to an embodiment of the present invention, meso-macro pores may include mesopores existing inside magnesium oxide particles and macropores existing between magnesium oxide particles. The mesopores may have a diameter of 2 to 50 nm, and a pore volume of 0.05 to 2 $cm^3/g$. In addition, the macropores may have a diameter of 50 to 5,000 nm and a pore volume of 0.05 to 20 $cm^3/g$. When the mesopores and the macropores have such ranges of diameter and volume, a catalytic component may be easily located on the surface of the magnesium oxide structure.

The magnesium oxide structure according to an embodiment of the present invention may have various shapes, and may be, for example, a cylindrical shape or a spherical shape bead, and a length thereof may be in a range of 0.5 to 10 mm.

Another aspect of the present invention provides a catalyst including: a magnesium oxide structure with meso-macro pores prepared by using the method described above; and a catalytic component supported by the structure.

The catalytic component may vary according to purpose of the catalyst and is not limited thereto, and may include at least one component selected from Ni, Co, Ru, Rh, Cu, Ag, Au, Pt, Pd, Sb, Sc, Sr, V, Cu, Y, Ce, Mo, W, Fe, Zr, Zn, Cd, Mn, Ca, Ba, Cs, Cr, Mg, Ti, Al, In, Sn, Se, Fe, Te, Ga, Gd, Ge, Dy, Pr, Sm, Ho, Lu, Tb, Eu, Nd, La, Ta, Hf, Er, and Yb.

According to an embodiment of the present invention, the catalyst may be prepared by using a method including supporting a catalytic component precursor on a magnesium oxide structure with meso-macro pores prepared by using the method described above; and heat treating the catalytic component precursor-supported magnesium oxide structure under a hydrogen gas atmosphere.

The supporting of the catalytic component precursor is not particularly limited and may include, for example, immersing or kneading. For example, immersing of the catalytic component precursor in a solution containing the magnesium oxide structure and drying of the catalytic component precursor-supported magnesium oxide structure may be repeated performed. In addition, the immersing may be performed under atmospheric pressure or vacuum condition, and the drying may be performed with microwaves to increase a supporting efficiency of a catalytically active material.

The heat treating may be performed in a range of 200 to 800° C.

In the method of preparing the catalyst according to an embodiment of the present invention, a catalytic component precursor is supported and then, the catalytic component precursor is reduced with various reactive or carrier gas according to the catalytic component precursor, and examples of the reactive or carrier gas are hydrogen, nitrogen, argon, helium, alcohol, methane, propane, and isobutane. The reactive or carrier gas may promote or block a reaction of the catalytic component precursor to control the size and shape of catalyst particles.

The catalyst may have excellent catalytic activity due to the presence of a catalytic component on the surface of the support.

The catalyst according to an embodiment of the present invention may be used in Fischer-Tropsch (FT) process, reforming process, natural gas-to-liquid (GTL), or a bio catalyst process.

Hereinafter, examples of the present invention are described in detail. However, the present invention is not limited to the examples.

Example 1

25.6 g of magnesium nitrate 6 hydrate ($Mg(NO_3)_2 \cdot 6H_2O$, 98%, Junsei) was dissolved in 1,000 ml of ethanol to obtain 0.1 M of magnesium nitrate 6 hydrate in ethanol solution. The obtained solution was added to a temperature and pressure-controllable supercritical reactor (independently manufactured), and carbon dioxide fluid was added thereto at a fluid rate of 24 cc/min while stirring, and the reaction temperature increased to 150° C. and the pressure increased to 20 MPa and the supercritical carbon dioxide state was maintained for 10 to 240 minutes to perform a reaction. Then, the supercritical reactor was cooled to room temperature and a pressure thereof slowly decreased to atmospheric pressure. A remaining solution was separated from a reaction product and the resultant reaction product was dried at the temperature of 100° C. or lower to obtain fine powder of magnesium oxide precursor for forming mesopores. The dried fine powder was a spherical or cube-like shape, and as shown in Table 1, a specific surface area thereof measured by BET was in a range of 1.5 to 87.7 $m^2/g$, and after sintering at the temperature of 600° C., the specific surface area thereof was in a range of 67.5 to 90.3 $m^2/g$.

Table 1 shows values of BET specific surface areas of magnesium oxide precursor powder, and BET specific surface areas of magnesium oxide powder after the sintering at the temperature of 600° C., at different temperatures of the supercritical carbon dioxide treatment for obtaining magnesium oxide precursor powder for forming mesopores.

TABLE 1

| Reaction temperature (° C.) | BET(m²/g) magnesium oxide precursor | BET(m²/g) magnesium oxide powder | Mean pore size (nm) magnesium oxide powder | Total pore volume (cm³/g) magnesium oxide powder |
|---|---|---|---|---|
| 50 | 87.7 | 86.2 | — | — |
| 80 | 78.7 | 79.1 | — | — |
| 140 | 63.0 | 67.5 | — | — |
| 150 | 3.4 | 78.2 | 2.4 | 0.245 |
| 180 | 2.1 | 90.3 | 2.4 | 0.291 |
| 200 | 1.5 | 70.6 | 2.5 | 0.185 |

By comparing the BET specific surface areas of magnesium oxide precursor powder with the BET specific surface areas of magnesium oxide powder after sintering, it was confirmed that after the sintering, the magnesium oxide precursor forms mesopores within the magnesium oxide structure.

1.7 g of the spherical magnesium oxide precursor powder for forming mesopores was added to 1,000 ml of 0.1M of magnesium nitrate 6 hydrate aqueous solution, and while stirring, 1M ammonia aqueous solution was added dropwise to the mixture until a pH of the mixture was in a range of 8 to 11 to form precipitates. The resultant was centrifuged to perform a solid-liquid separation to obtain a powder mixture in a sludge state. A cellulose binder and water were added to the powder mixture to form a paste and the paste was extruded to form a cylindrical bead type molded product having a diameter of about 0.5 to 3 mm and a height of 0.5 to 5 mm.

The molded powder mixture was sintered as follows: the molded powder mixture was heated from room temperature at a temperature increase rate of 5° C. per minute under a nitrogen gas atmosphere and at the temperature of 1,300° C., the temperature was maintained for 1 hour, and then, the temperature decreased to room temperature at a temperature decrease rate of 5° C. per minute. After the sintering, the specific surface area of the bead-shape magnesium oxide structure was measured by BET. A result thereof was 40.3 m²/g.

Example 2

A magnesium oxide structure was obtained in the same manner as in Example 1, except that 1.7 g of the cube-like magnesium oxide precursor powder for forming mesopores prepared according to Example 1 was added to 1M ammonia aqueous solution with a same volume as used to manufacture the bead-shape magnesium oxide structure of Example 1, and the mixed solution was added to 1,000 ml of 0.1M magnesium nitrate 6 hydrate aqueous solution to form precipitates.

After the sintering, a specific surface area of the bead-shape magnesium oxide structure was measured by BET and a result thereof was 49.8 m²/g.

Figure 2A:
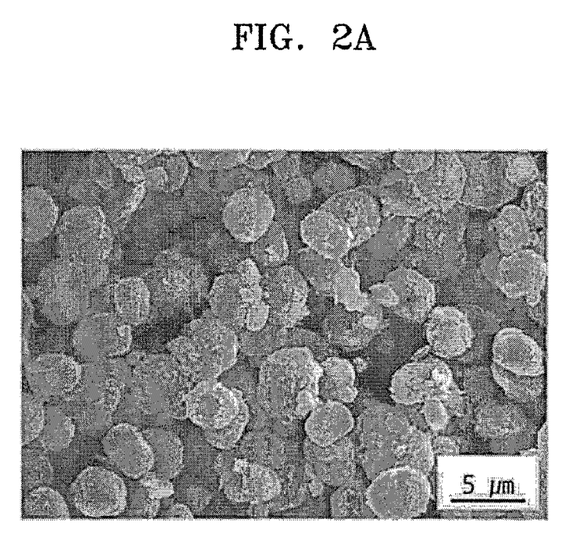
FIGS. 2A and 2B show field emission-scanning electron microscope (FE-SEM) images of magnesium oxide precursor powder prepared according to Examples 1 and 2, respectively.
Figure 2B:
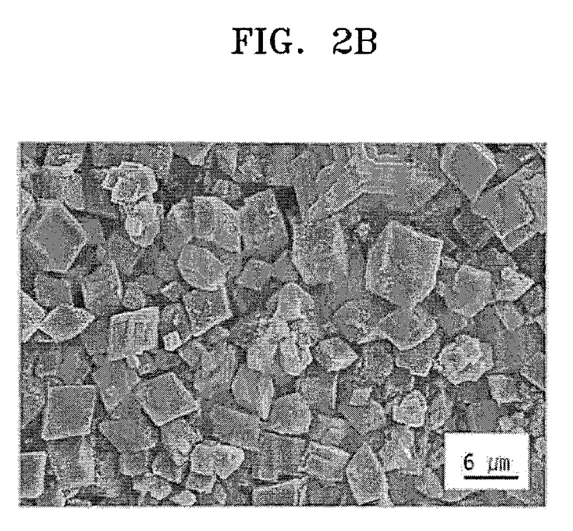

FIGS. 2A and 2B show FE-SEM images of magnesium oxide precursor powder for forming mesopores prepared according to Examples 1 and 2, respectively. FIG. 2A shows an image of spherical magnesium oxide precursor powder and FIG. 2B shows an image of cube-like magnesium oxide precursor powder.

Figure 3:
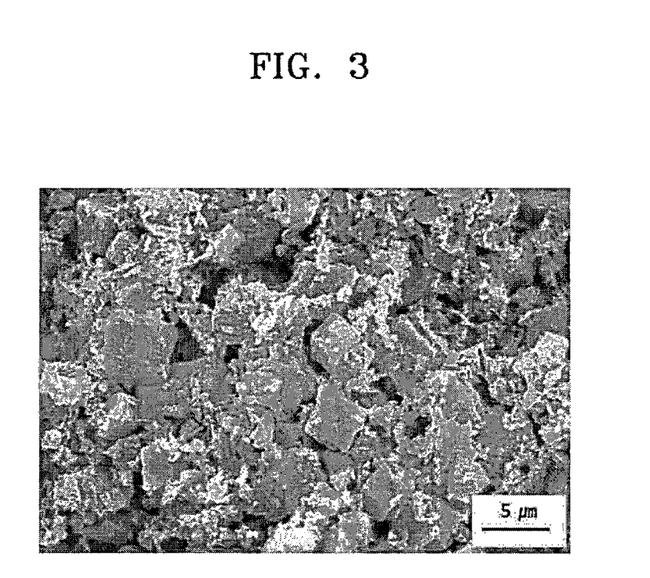
FIG. 3 shows an FE-SEM image of the surface of a magnesium oxide structure prepared according to Example 2.

FIG. 3 shows an FE-SEM image of the surface of a magnesium oxide structure prepared according to Example 2. Referring to FIG. 3, it was confirmed that cube-like magnesium oxides are well distributed on an inorganic binder that acts as a matrix.

Figure 4:
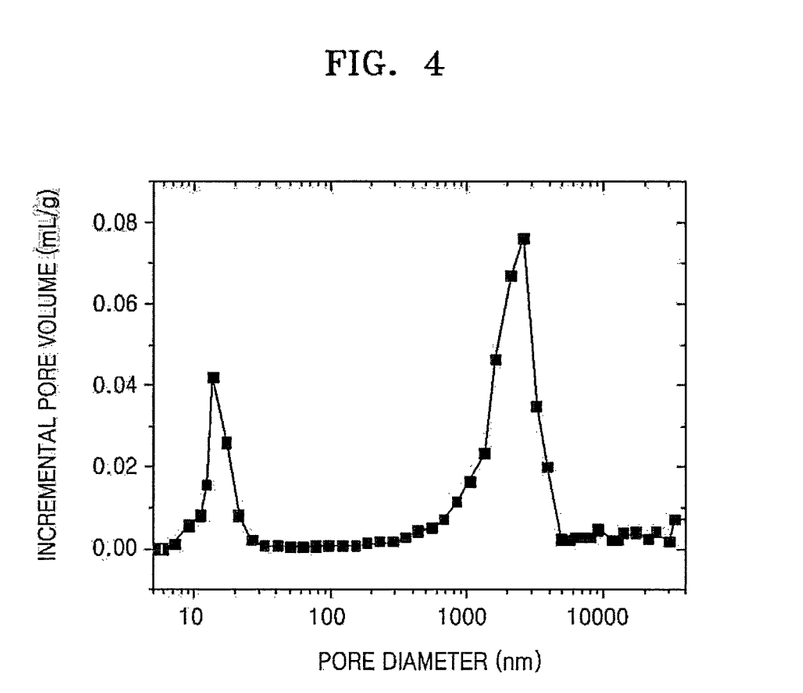
FIG. 4 is a graph of an incremental pore volume with respect to a pore diameter of a magnesium oxide structure prepared according to Example 2, which is measured by mercury intrusion porosimetry.

FIG. 4 is a graph of an incremental pore volume with respect to a pore diameter of a magnesium oxide structure prepared according to Example 2, which is measured by mercury intrusion porosimetry. The graph of FIG. 4 indicates that a magnesium oxide structure according to an embodiment of the present invention has meso-macro pores, and shows two distinctive peaks with two maximum values corresponding to mesopores (about 6-35 nm) and macropores (about 250-5,000 nm). A mean pore size (including mesopores and macropores), a specific surface area, and a porosity were 2,425 nm, 49.8 m²/g, and 62.1%, respectively. Referring to FIG. 4, it was confirmed that a magnesium oxide structure with meso-macro pores was stably formed.

Examples 3-1, 3-2, 3-3, and 3-4

A magnesium oxide structure was prepared in the same manner as in Example 2, except that 1.7 g of the cube-like magnesium oxide precursor powder for forming mesopores prepared according to Example 2 was added to 1M ammonia aqueous solution with a same volume as used to prepare the bead-shape magnesium oxide structure of Example 1, and 1,000 ml of a mixed solution of 0.1 M magnesium nitrate 6 hydrate aqueous solution and 0.1 M aluminum nitrate 9 hydrate aqueous solution at a molar ratio of 1:2 were added thereto while stirring to form precipitates, and sintering was performed thereon at the temperature of 1,000° C. in the case of Example 3-1, at the temperature of 1,100° C. in the case of Example 3-2, at the temperature of 1,200° C. in the case of Example 3-3, and at the temperature of 1300° C. in the case of Example 3-4 for 1 hour.

After the sintering, specific surface areas of the magnesium oxide structure were measured by BET, and results thereof were, respectively, 64.0, 45.0, 50, and 25.0 m²/g after sintering at the temperatures of 1,000° C., 1,100° C., 1,200° C., and 1,300° C.

Figure 5:
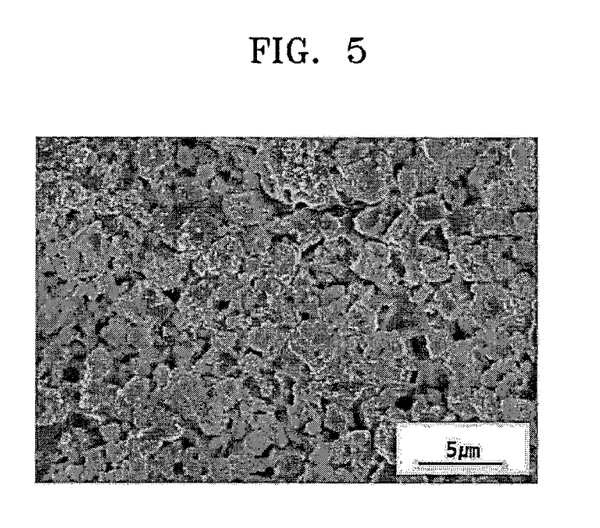
FIG. 5 shows an FE-SEM image of the surface of a magnesium oxide-spinel composite support prepared according to Example 3-1.

FIG. 5 shows a FE-SEM (Hitachi, S-4100) image of the surface of a magnesium oxide structure prepared according to Example 3-1. Referring to FIG. 5, cube-like magnesium oxide particles bind to each other due to an inorganic binder, and macropores are formed between cube-like particles.

Figure 6:
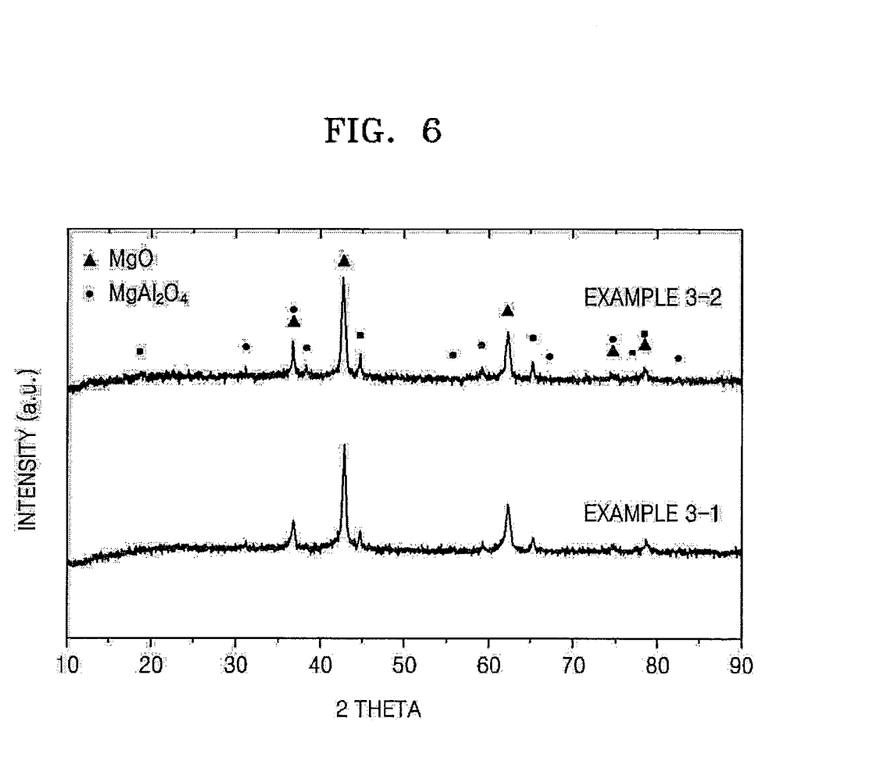
FIG. 6 shows XRD analysis results of magnesium oxide-spinel composite supports prepared according to Examples 3-1 and 3-2.

FIG. 6 shows XRD analysis results of the bead-shape magnesium oxide structure prepared by sintering at temperatures of 1,100° C. and 1,200° C. according to Examples 3-2 and 3-3. From X-ray analysis results, only peaks corresponding to magnesium oxide and spinel were identified, and this indicates the formation of magnesium oxide-spinel composite structure in which cube-like magnesium oxide particles are placed on a spinel-phase inorganic binder as a matrix.

Example 4

Nickel nitrate 6 hydrate was weighed in such a way that the amount of nickel was 15 wt % based on the weight of the bead-shaped magnesium oxide support prepared according to Example 1, and then the resultant was immersed in an alcohol solution of magnesium oxide at an concentration of 4.5 mol/L. Then, the resultant was dried with microwaves at the temperature of 100° C. The immersing and drying were repeatedly performed thereon three times to permeate the catalytic material precursor.

The catalytic material precursor-supported magnesium oxide beads were heated from room temperature at a temperature increase rate of 5° C. per minute under a mixed gas atmosphere of hydrogen and nitrogen at a volumetric ratio of 2:1, and when the temperature reached 400° C., the temperature was maintained for 1 hour, and then the temperature decreased to room temperature at a temperature decrease rate of 5° C. per minute, thereby reducing a catalytic material.

A specific surface area of a reduced nickel-supported catalyst was measured by BET, and a result thereof was 88.5 m$^2$/g.

Example 5

A catalytic material precursor was permeated under the same supporting conditions as Example 4, except that as the catalytic material precursor, cobalt nitrate 6 hydrate was used instead of nickel nitrate 6 hydrate.

The catalytic material precursor-supported magnesium oxide beads were heated from room temperature at a temperature increase rate of 5° C. per minute under a hydrogen gas atmosphere and at the temperature of 500° C., the temperature was maintained for 5 hours, and then, the temperature decreased to room temperature at a temperature decrease rate of 5° C. per minute, thereby reducing the catalytic material.

A specific surface area of a reduced cobalt-supported catalyst was measured by BET, and a result thereof was 120.27 m$^2$/g.

Example 6

A nickel-based catalyst supported on a magnesium oxide structure was obtained in the same manner as in Example 4, except that the bead-shape magnesium oxide structure of Example 2 was used. A specific surface area of the reduced nickel-supported catalyst was measured by BET, and a result thereof was 105.6 m$^2$/g.

Example 7

Figure 7:
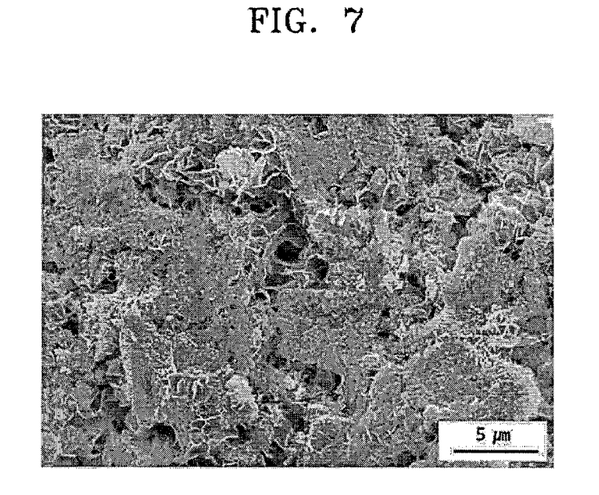
FIG. 7 shows an FE-SEM image of a cobalt-supported magnesium oxide support prepared according to Example 7.

A cobalt-based catalyst supported on a magnesium oxide structure was obtained in the same manner as in Example 5, except that the bead-shape magnesium oxide catalyst support of Example 2 was used. A specific surface area of a reduced cobalt-supported catalyst was measured by BET, and a result thereof was 223.5 m$^2$/g. FIG. 7 shows an FE-SEM image of the cobalt based catalyst supported on the magnesium oxide prepared according to Example 7. Referring to FIG. 7, it was confirmed that a 3-dimensional nano web-structured inorganic binder matrix was formed between cube-like magnesium oxide particles.

Figure 8:
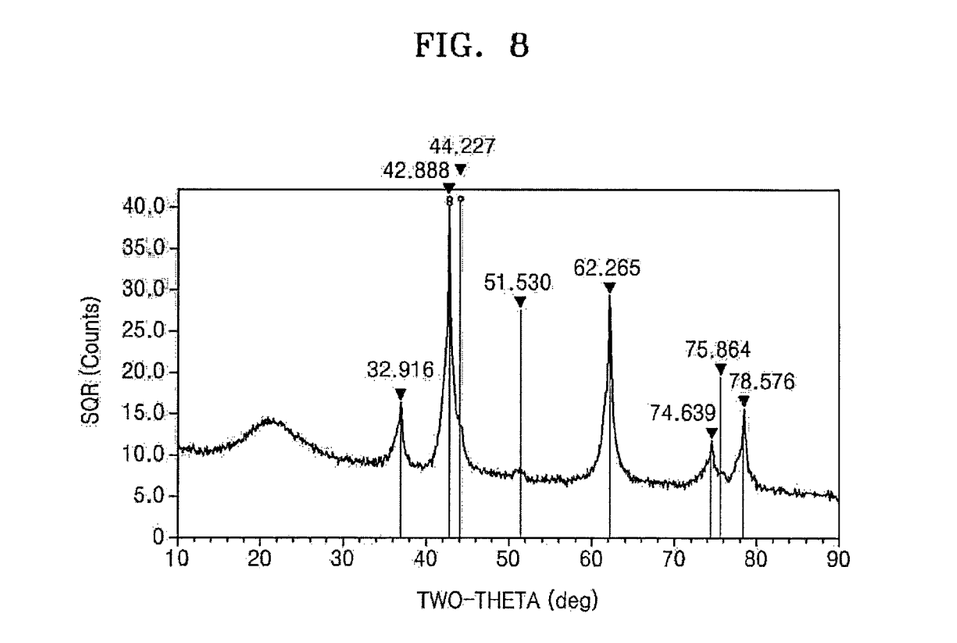
FIG. 8 shows XRD analysis results of a cobalt-supported magnesium oxide support prepared according to Example 7.

FIG. 8 shows XRD analysis results of the cobalt based catalyst supported on the magnesium oxide prepared according to Example 7. Referring to FIG. 8, only two major peaks corresponding to magnesium oxide and cobalt are confirmed, indicating that the cobalt nano catalyst is well dispersed in the magnesium oxide support.

Example 8

A nickel-based catalyst supported on a magnesium oxide structure was obtained in the same manner as in Example 6, except that the bead-shape magnesium oxide structure of Example 3-1 was used. A specific surface area of the reduced nickel-supported catalyst was measured by BET, and a result thereof was 85 m$^2$/g.

Example 9

A cobalt-based catalyst supported on a magnesium oxide structure was obtained in the same manner as in Example 7, except that the bead-shape magnesium oxide structure of Example 3-1 was used. A specific surface area of a reduced cobalt-supported catalyst was measured by BET, and a result thereof was 104 m$^2$/g.

TABLE 2

| Example No. | Catalytic material | Specific surface area (m$^2$/g) | Total pore volume (cm$^3$/g) | Mean pore diameter (nm) |
|---|---|---|---|---|
| Example 1 | — | 40.3 | 0.2144 | 21.2 |
| Example 2 | — | 49.8 | 0.2830 | 22.7 |
| Example 3-1 | — | 64.0 | 0.2861 | 17.8 |
| Example 3-2 | — | 45.0 | 0.1985 | 12.7 |
| Example 3-3 | — | 50.0 | 0.1599 | 12.7 |
| Example 3-4 | — | 25.0 | 0.1055 | 11.5 |
| Example 4 | Nickel | 88.5 | 0.3015 | 13.6 |
| Example 5 | Cobalt | 120.3 | 0.4684 | 15.6 |
| Example 6 | Nickel | 105.6 | 0.4065 | 15.7 |
| Example 7 | Cobalt | 223.5 | 0.7045 | 12.6 |
| Example 8 | Nickel | 101.0 | 0.2180 | 8.4 |
| Example 9 | Cobalt | 85.0 | 0.1331 | 6.2 |

Referring to Table 2, when a catalytic material was supported by the magnesium oxide structure, a specific surface area and a total pore volume were increased. In addition, the specific surface area of the magnesium oxide structure prepared according to Example 2 was more increased compared to that of Example 1, and accordingly, the structure of Example 2 may have higher activity than that of Example 1. In addition, when a catalytic material, such as nickel or cobalt, was supported as described in Examples 6 and 7, a specific surface area was further increased, and accordingly, metal catalyst that is supported by the magnesium oxide beads prepared according to Examples 6 and 7 may have higher activity than those supported by prepared according to the magnesium oxide beads prepared according to Examples 4 and 5. In terms of chemical stability, the magnesium oxide-spinel structure of Examples 8 and 9 may be advantageous compared to those of Examples 6 and 7.

Figure 9A:
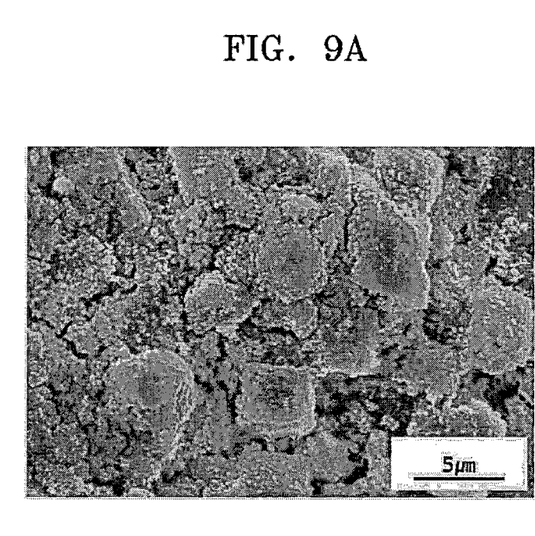
FIG. 9A shows an FE-SEM image of the surface of nickel-supported magnesium oxide-spinel catalyst support prepared according to Example 8.
Figure 9B:
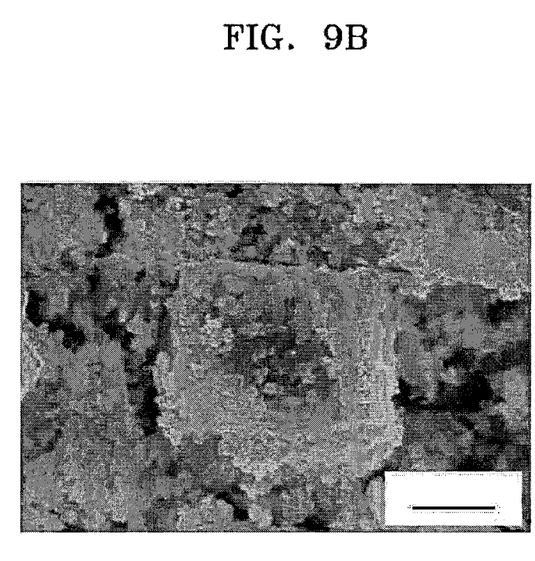
FIG. 9B is an enlarged image of FIG. 9A.

FIG. 9A shows an FE-SEM image of the surface of the nickel based catalyst supported on magnesium oxide-spinel prepared according to Example 8. FIG. 9B is an enlarged image of FIG. 9A (×3.5 magnification). As shown in FIG. 9A, nano-scale nickel nano particles are formed on the surface of cube-like magnesium oxide support particles.

Figure 10A:
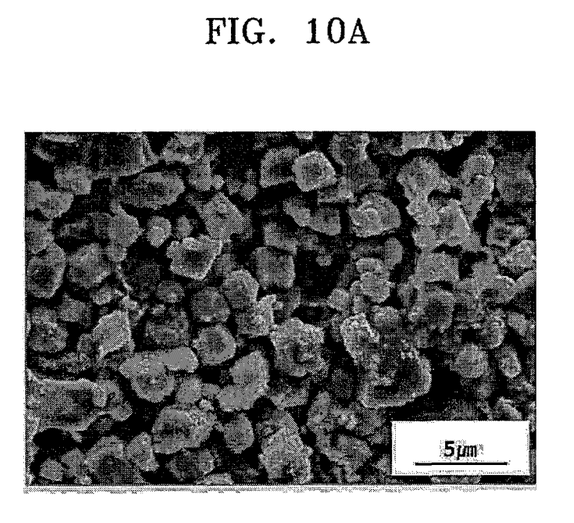
FIG. 10A shows an FE-SEM image of the surface of cobalt-supported magnesium oxide-spinel catalyst support prepared according to Example 9.
Figure 10B:
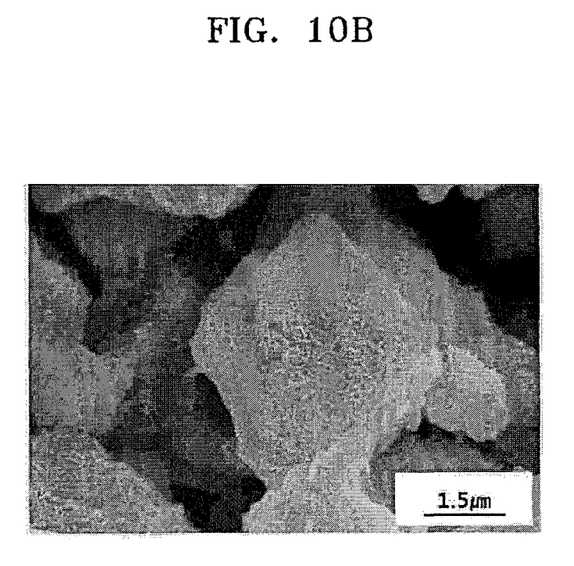
FIG. 10B is an enlarged image of FIG. 10A.

FIG. 10A shows an FE-SEM image of the surface of cobalt-supported magnesium oxide-spinel catalyst prepared according to Example 9. Referring to FIGS. 10A and 10B (an enlarged image of FIG. 10A), cube-like particles strongly bind to each other due to a nanoweb-structured inorganic binder, and cobalt nano particles are formed on the cube particle surface and the nanoweb surface.

A magnesium oxide structure with meso-macro pores prepared by using a method according to an embodiment of the present invention may provide a supported catalyst with high permeability of a reactive gas, large specific surface area, and high strength, and a stationary adsorbent or an adsorbent support for separation or adsorption of carbon dioxide.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A catalyst comprising:
   (a) a magnesium oxide structure comprising sintered magnesium oxide particles, mesopores, macropores, and a porous inorganic binder matrix, wherein
   the mesopores are disposed within the sintered magnesium oxide particles;
   the macropores are disposed between the sintered magnesium oxide particles including the mesopores; and
   the inorganic binder matrix bridges between the sintered magnesium oxide particles including the mesopores and has a 3-dimensional nano web-structure; and
   (b) a catalytic component supported on the magnesium oxide structure, wherein the catalytic component is selected from the group consisting of Ni, Co, Pt, Pd, Rh, Cu, Fe, Ag, Au, Sb, Sc, Sr, V, Cu, Y, Ce, Mo, W, Fe, Zr, Zn, Cd, Mn, Ca, Ba, Cs, Cr, Mg, Ti, In, Sn, Se, Fe, Te, Ga, Gd, Ge, Dy, Pr, Sm, Ho, Lu, Tb, Eu, Nd, La, Ta, Hf, Er, and Yb.

2. The catalyst of claim 1, wherein the mesopores have a diameter of 2 to 50 nm and a pore volume of 0.05 to 2 $cm^3/g$.

3. The catalyst of claim 1, wherein the macropores have a diameter of 50 to 5,000 nm and a pore volume of 0.05 to 20 $cm^3/g$.

4. The catalyst of claim 1, wherein the magnesium oxide structure has a cylindrical or spherical bead shape.

5. The catalyst of claim 1, wherein the catalytic component is selected from the group consisting of Ni, Co, Pt, Pd, Rh, Cu, Fe, Ag, and Au.

6. The catalyst of claim 1, wherein the magnesium oxide structure comprises the sintered magnesium oxide particles in the range of particle size from 1 to 500 μm.

7. The catalyst of claim 1, wherein the diameter of the mesopores is 2 to 50 nm, and the diameter of the macropores is 50 to 5,000 nm.

8. The catalyst of claim 1, wherein the catalytic component comprises Co.

9. The catalyst of claim 1, wherein the catalytic component comprises Pt.

10. The catalyst of claim 1, wherein the catalytic component comprises Pd.

11. The catalyst of claim 1, wherein the catalytic component comprises Rh.

12. The catalyst of claim 1, wherein the catalytic component is selected from the group consisting of Sb, Sc, Sr, V, Cu, Y, Ce, Mo, W, Fe, Zr, Zn, Cd, Mn, Ca, Ba, Cs, Cr, Mg, Ti, In, Sn, Se, Fe, Te, Ga, Gd, Ge, Dy, Pr, Sm, Ho, Lu, Tb, Eu, Nd, La, Ta, Hf, Er, and Yb.

13. The catalyst of claim 1, wherein the catalytic component is selected from the group consisting of Dy, Pr, Sm, Ho, Lu, Tb, Eu, Nd, La, Ta, Hf, Er, and Yb.

14. The catalyst of claim 1, wherein the porous inorganic binder matrix is selected from the group consisting of magnesium oxide, aluminum oxide, magnesium aluminate spinel and a combination of magnesium oxide and aluminum oxide.

15. The catalyst of claim 14, wherein the porous inorganic binder matrix comprises Mg.

16. A magnesium oxide structure comprising:
   sintered magnesium oxide particles;
   mesopores disposed within the sintered magnesium oxide particles
   macropores disposed between the sintered magnesium oxide particles including the mesopores; and
   a porous inorganic binder matrix bridging between the sintered magnesium oxide particles including the mesopores, having a 3-dimensional nano web-structure, and comprising magnesium oxide and aluminum oxide or magnesium aluminate spinel.

17. The magnesium oxide structure of claim 16, wherein the mesopores have a diameter of about 2 nm to 50 nm and a pore volume of about 0.05 $cm^3/g$ to about 2 $cm^3/g$, and the macropores have a diameter of about 50 nm to about 5,000 nm and a pore volume of about 0.05 $cm^3/g$ to about 20 $cm^3/g$.

* * * * *